Feb. 9, 1965   E. A. ÅKE JOSEFSSON ETAL   3,169,055
PROCESS FOR PRODUCING PIG IRON IN ROTARY FURNACE
Filed Oct. 9, 1962
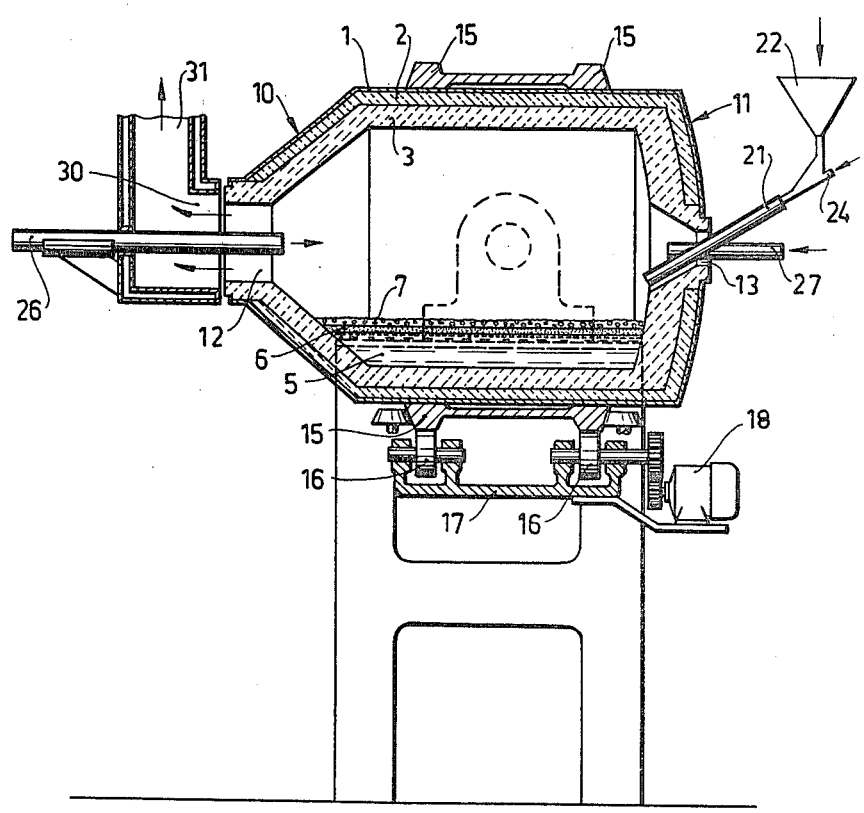

United States Patent Office
3,169,055
Patented Feb. 9, 1965

3,169,055
PROCESS FOR PRODUCING PIG IRON IN ROTARY FURNACE
Erik Anders Åke Josefsson, Erik Axel Bengtsson, and Kurt Karl Axel Almqvist, Borlänge, Sweden, assignors to Stora Kopparbergs Bergslags Aktiebolag, a company of Sweden
Filed Oct. 9, 1962, Ser. No. 230,311
Claims priority, application Sweden, Oct. 12, 1961, 10,156
13 Claims. (Cl. 75—40)

This invention relates to the production of pig iron in a rotary furnace from iron oxide matter by reduction with carbonaceous matter, such as coke, coal and anthracite, in the presence of slag forming matter. It is more particularly concerned with the conversion of, possibly more or less prereduced, iron ore or concentrate thereof directly into pig iron. It is known in the art that pig iron can be produced by supplying iron ore and a reducing agent to a melt of pig iron in a furnace in which the heat required for the process is provided by burning the carbon monoxide produced with oxygen brought into the furnace.

It is an object of the invention to make possible to obtain pig iron rapidly, in a high yield and with a good heat economy. It is also an object of the invention, in one of its aspects, to provide means for producing from iron ore or other iron oxide matter rich in phosphorus, such as matter containing phosphorus of the order of 0.5%, or more, a pig iron poor in phosphorus, containing preferably not more than 0.05% or even less than 0.02%, such as about 0.015% P.

In order to obtain these objects and other advantages that will be obvious to those skilled in the art the present process is carried out in the following way in a rotary furnace internally lined with refractory material. The furnace is rotated with at least 10, preferably at least 20 rev. per min. with the axis of rotation in substantially horizontal position, i.e. declined not more than 45°, preferably not more than 30° to the horizontal. Comminuted iron oxide material and comminuted carbonaceous material are supplied to the surface of a body of slag maintained in the furnace at a temperature not exceeding 1450° C., preferably between about 1200 and 1400° C. or rather between about 1250 and 1350° C. At this temperature the iron oxide is reduced by the carbon which is thereby oxidized to carbon monoxide. It is an important feature of the invention that a reduction layer, at least partly built up by the carbon monoxide formed, is formed and maintained on top of the slag layer, thus forming a shield between the zone of metallurgical reaction and the gas space above the bath in the furnace. For attaining the temperature required carbon monoxide emanating from the reduction layer is burned to carbon dioxide by a gas rich in oxygen, preferably containing more than 40% or still better more than 60% $O_2$, such as commercial oxygen, which is blown in, as through lances, into the gas space in the furnace in such a manner that the oxygen does not penetrate through said shield or reduction layer. It is important according to the invention that at least half of the carbon monoxide evolved is oxidized, and for fully attaining the advantages of the invention at least about two-thirds of the monoxide should be burned to dioxide, care being taken that substantially no oxygen reaches the reaction zone in the reduction layer and the slag and that the temperature therein does not exceed 1400° C. or possibly 1450° C. Furthermore, the proportion of carbonaceous matter supplied relative to the iron oxide charged must be such that, under prevailing conditions, the pig iron formed obtains a carbon content of at least 3%, although the improvements of the present invention may be attained already in the range 2–3%.

Slag formers have also to be supplied to the furnace, and if an acid slag is wanted sand or other acidic matter may be charged, unless silica from ashes and the gangue of the charged ore is sufficient. Within the temperature limits prescribed the acid slag is in a rather viscous state and the slag layer may then incorporate the carbonaceous matter forming on effective reaction medium on the bath surface. Such a layer will permit gases easily to escape and reduced carburized iron droplets to pass into the iron bath.

Particularly in processing material rich in phosphorus one has to use a basic slag if a low phosphorus pig iron shall be obtained. Then the furnace is to be charged with basic slag formers, usually of the class consisting of carbonates and oxides of calcium and magnesium, such as lime, lime stone or dolomite, the furnace, of course, being in this case advantageously lined with basic material. The ratio of $CaO+MgO$ to $SiO_2$ in the slag should be over 1 but not exceed 2, and slag formers supplied accordingly. The reduction layer on top of the slag should in this case comprise particulate carbonaceous matter of a grain size sufficiently large for establishing a layer of particles floating on the surface of the slag, preferably of the order of up to one inch or 2.5 cm., the slag should be quick fluent. Therefore, and in order to promote the phosphorus refining the proportions of oxygen supplied, on the one hand, in gaseous form and, on the other hand, in the form of iron oxide matter should be adjusted and the thickness of the layer of carbonaceous matter be regulated so that the content of iron oxide in the slag becomes at least 2%, calculated as Fe.

The present process is suitable for processing partly reduced iron ores, and especially products from the reduction of iron ore in dry state with, for instance, carbon monoxide containing gases. Such products are often difficult to smelt in usual way. It is thus possible in the present process to charge iron ore material in which 5–100% of the iron is in the form of oxides and the rest substantially in metallic form.

For a better understanding of the invention it will now be described more in detail with reference to the accompanying drawing illustrating, only by way of example, a rotary furnace suitable for carrying out the invention, it being understood, however, that the description may, in principle, be applicable to other designs of rotary furnaces as well.

The furnace illustrated consists of a cylindric body comprising an outer shell 1 of iron plate internally provided with an insulating layer 2 and a refractory lining 3 of acidic or basic nature, as the case may be. The furnace is shown with a bath comprising a bottom layer 5 of pig iron, a slag layer 6 on top thereof, and a reduction bed 7 floating thereon. The furnace has two end walls 10 and 11 each provided with an opening 12 and 13. The furnace body has two annular tread rings 15 resting on support-rollers 16 mounted in a tipable cradle 17, at least one of the rollers being driven by a motor 18. A pipe 21 is inserted through opening 13 sloping towards the bath and is provided at its outer upper end with a hopper 22 for the supply of solid charge components, ore or the like, carbonaceous matter and/or slag formers, to the bath. An air inlet 24 is arranged beyond the hopper for the injection of compressed air for facilitating the charging of solids. Through this air of transportation, it is true, some oxygen will penetrate through the reduction layer but in consideration of its relatively small quantity the oxidizing effect thereof can be disregarded.

Oxygen is supplied through both openings 12 and 13 by means of lances 26 and 27, respectively, which are horizontally positioned in order that the oxygen jet shall not disturb the reduction layer 7. The lances may for this reason with advantage be directed upwardly away from the bath. If they are directed downwardly great care must be taken. Although not shown the lances may be movable so that the direction of the oxygen jet and the place of entrance of the oxygen can be adjusted. The opening 12 serves as exhaust gas outlet and is, therefore, covered by a hood 30 connected to a flue 31.

The furnace is shown in horizontal position but it can be set at various inclinations. The inlets for solids and oxygen as well as the gas outlet can be arranged arbitrarily at the one or both end walls, and the furnace may have only one opening. In the latter case it can be set at a greater inclination. On account of the rotation of the furnace an intimate mixing is effected and therefore the starting materials may be supplied apart at different parts of the furnace.

The process may be started by charging a small amount of pig iron in molten state to the furnace or by smelting pig iron in the furnace, but may also be started directly by adding ore, carbonaceous matter and slag forming materials to a bed of carbonaceous matter. In the latter case a pig iron bath covered with slag will rapidly be formed. According to the invention it is essential that the reduction of the ore is started at a sufficiently high carbon content of the pig iron and at a suitable temperature. Already at the beginning of the reduction the pig iron should have a carbon content of at least 3.0% and preferably higher. If the carbon content is too low the process is opened by carburization under rotation and possibly under oxygen blowing to maintain the temperature.

When the above conditions prevail the ore and the reducing agent are continuously supplied to the bath under simultaneous blowing of oxygen over the surface of the bath and rotating of the furnace, the ore and the reducing agent being introduced separately or mixed by suitable transporting means e.g. injection twyers. As a carrier gas at the injection, air or a gaseous reducing agent, e.g. natural gas, may be used. When the starting materials are injected they are conveniently introduced in crushed or ground form. If air is used as a bearing gas the oxygen of the air, it is true, comes close to the surface of the bath but the amount of oxygen thus fed is so small that it does not noteworthy disturb the reducing conditions wanted near the surface of the bath. Oxygen gas is simultaneously blown into the furnace suitably in parallel with or at an angle away from the surface of the bath. When using a horizontally lying furnace it may be of a certain advantage as to the durability of the lining that the oxygen is blown in through both of the end walls. The amount of oxygen, suitably in the form of commercially pure oxygen, blown over the bath should as a rule be at least equal to or normally to some extent exceed the amount of oxygen which is brought to the bath in the form of ore oxygen and oxygen that may be introduced as bearing gas. The concentrate, the coal (the coke) and the oxygen are simultaneously fed into the furnace in the correct proportions. The heat in the exhaust gases from the furnace may be used for preheating the concentrate to be fed into the furnace in a suitable heat exchanger.

It is of great importance that the furnace is rotated with a sufficiently high speed. Firstly, the rotation contributes to transfer the heat generated by the combustion of the carbon monoxide to the bath thereby avoiding overheating of the furnace walls, secondly it has a mixing effect so that differences in composition and temperature in the bath and in the slag layer are equalized. Thus the rate of rotation should not be lower than 10 revolutions per minute and should preferably exceed 20 rev. per min.

When the reduction has thus started the indicated conditions are maintained by adjusting the amounts of ore, reducing agent and oxygen supplied. If the carbon content of the pig iron melt is tending to decrease too much, this is adjusted by increasing the amount of carbon supplied or decreasing the amount of ore supplied. As stated above the carbon content of the melt must not fall below 3%. Firstly the melting point of the iron bath increases at lower carbon contents so that the maximum temperature of about 1400° C. mentioned above is not enough in excess of the melting point, secondly a tendency for slag forming appears at lower carbon percentages which makes the process harder to control. The amount of ore plus reducing agent supplied should be of such an order of magnitude that the molten bath always is covered by ore and reducing agent, partly because of promoting the capacity of the furnace, partly because of a maximum utilization of the carbon monoxide produced inasmuch as a certain degree of prereduction takes place when the carbon monoxide reduces the ore in the reaction layer when it passes therethrough.

The oxygen is supplied at a satisfactory distance over the surface of the pig iron melt, and the oxygen gas stream is directed parallel to or from the melt surface. Hereby, it is attained that the oxidizing zone occurring at the twyers for the supply of oxygen does not penetrate through the layer containing the carbonaceous matter. This means that the reactions near the surface of the bath take place at satisfactory reducing conditions. The reducing carbon supplied will mainly be used for reducing the ore and carburization of the pig iron melt, and the carbon monoxide arising from the reaction zone can to some extent prereduce the ore which might be found on top of the slag. Not until arisen higher up in the furnace, at a distance from the surface of the bath, the carbon monoxide will be burned by the oxygen supplied.

At the reducing conditions chosen the amount of carbon monoxide evolved will be sufficient for maintaining the wanted temperature by its combustion with oxygen. The portion of the carbon monoxide to be burned for maintaining the temperature is of course depending upon the special conditions existing. However, it has been found that a combustion of 80–100% of the carbon monoxide to carbon dioxide will maintain the temperature at a desired value. The temperature shall not exceed 1400° C., as higher temperatures will smelt the ore and tend to dissolve it in the slag before it is reduced which at least in the acid version of the process is inconvenient from a reducing point of view. Furthermore, it has proved hard by higher temperatures to carry out the acid process with that high carbon dioxide content in the exhaust gases that are possible by lower temperatures. Preferably the temperature here should be below 1350° C. The relatively low working temperature range used at the present invention is advantageous also as the wear of the furnace lining becomes fairly low.

According to the invention it is advisable to use a solid reducing agent poor in gas-forming components. The reduction of the ore occurs namely mainly by reaction with solid carbon and under circumstances with the carbon dissolved in the pig iron. In the latter case the carbon will have to be dissolved in the pig iron before it can act as a reducing agent. By the use of, for instance, a coal rich in gas forming components a large part of the gas-forming components will rapidly become gasified after being brought into the furnace, thus not being used for their intended purpose. Therefore, it is preferred to use coke or coal poor in gas-forming components. On the other hand the heat of the exhaust gases of the process can advantageously be used for coking of coal rich in gas-forming components.

The amount of supplied oxygen and the way in which it is introduced thus plays an important role in the method according to the present invention. On one hand, the oxygen has to be supplied in such a way that the oxidizing zone in the furnace does not reach the surface of the bath, and, on the other hand, the amount thereof has to be that great and the mixing with the carbon monoxide that complete that the carbon monoxide is burned inside the furnace, thereby being effectively utilized for maintaining the wanted reaction temperature. As can be seen from the above reaction conditions chosen according to the invention will allow both of these conditions to be fulfilled.

It is an essential advantage of the process that it can be carried out in a furnace with an acidic lining. The iron ores often contain more or less acidic gangue (rich in $SiO_2$) besides which the ashes from the coke and the coal used as reducing agents usually are acidic. If no basic slag formers are introduced the slag produced by the process usually obtains a $SiO_2$-content which reaches saturation which in this case is about 50%.

At temperatures here involved an acidic lining is very little affected by such a $SiO_2$ saturated slag, while in a basic-lined furnace lime has to be introduced to protect the lining. However, it is a presumption that the highly acidic slag does not prevent the practical carrying through of the process. In a rotary furnace, however, the acidic slag can be given such a consistency, by choosing temperature and carbon content of the bath according to the above, that it can be used as a reaction space for the reduction of the iron oxide by contact with solid carbon; thereby the slag becomes porous, pervious for reduced iron as well as for gases formed. Thus, there is no demand for the reducing agent to pass through the slag layer into the metal bath before carrying on its reducing action.

The method according to the invention can be carried out batchwise or continuously.

In the particular case where the iron oxide raw material is rich in phosphorus not only shall the slag be basic but should, according to the invention, the reduction layer, onto which the comminuted iron oxide material and carbonaceous material is fed, comprise a bed of coke or coal or similar carbonaceous matter including pieces as explained above. The reduction layer is thus floating on a layer of molten basic slag which separates said reduction layer from the molten metal reduced out. According to the invention it is provided for the reduction of the ore or the iron oxide as well as the carburization of the metal reduced out substantially being carried out by direct contact with the reducing agent floating on the slag layer. The furnace should have a basic lining, preferably magnesite or dolomite in order to maintain a basic slag.

In a process carried out according to the invention it has quite surprisingly been found that the slag, if having a suitable composition and temperature, is capable even with the carbon content of the iron maintained at 3–4%, to take up the main part of the phosphorus of the charge so that only a few percent thereof are taken up by the iron, instead of 90% as is the case in the blast furnace process. It is also presumed that in the process a thorough mixing takes place by the rotation of the furnace; the peripheral speed should not be less than 0.5 m./sec. As to the composition of the slag the basicity, i.e. the ratio $CaO+MgO/SiO_2$, should not be less than 1.0 and the iron content should exceed 2%, preferably exceed 3%. For maintaining with certainty this iron content, in spite of the presence of reducing agent in excess, it has been found necessary to maintain the ratio $CO_2/CO$ in the gas above the bath at an average exceeding 1. The iron oxide content of the slag decreases with an increasing rotational speed and an increasing carbon layer thickness, while it increases with an increasing input of ore and oxygen. At a rotational speed of about 1 m./sec. and a carbon layer thickness of 2–5 cm. it is easy to maintain a satisfactory iron oxide content in the slag layer by a suitable balance of the oxygen supply. Furthermore the charge should be adjusted so as to give a slag which is quick fluent at the used working temperature, which is not allowed to exceed 1450° C. This adjustment is effected in a known way by adjusting the addition of lime and possible other slag formers (e.g. ores rich in $TiO_2$ or $Al_2O_3$) in relation to the analyses of the gangue of the ore and the ashes of the fuel used, so as to render the slag formed a suitable high fluidity. Thus it is possible, in this process, to use ores rich in titanium.

Furthermore, the pig iron obtained is practically free from silicon and manganese which is of a great advantage when the pig iron is used as a starting material for steel refining. On the other hand the sulphur content is relatively high when ordinary reducing agents are used; however, it is easy to eliminate it in a subsequent desulphurization step by known methods.

Besides the phosphorus refining further advantages are gained as compared to the melt-reduction in a rotary furnace previously suggested:

(a) Since the reduction mainly is carried out on the top of the molten slag the carbon monoxide generated by this reduction has not to pass through the slag and the risk of foaming is avoided.

(b) Since the slag is quick fluid a good separation is obtained of, on the one hand, the reducing agent which rises to the surface, and, on the other hand, the metal drops which sink down into the metal bath. Thereby the losses of carbon as well as of iron by the slag tapping are small.

(c) The progress of the process is very stable and is not affected by small variations in the supply of reducing agent, as this is present in excess on top of the slag surface.

As distinguished from previously suggested processes for direct ore reduction where the reduction is effected by the carbon dissolved in the metal, it is, in principle, not necessary in the present process to start from an iron melt already reduced, but it is possible to start with charging the preheated furnace with slag formers and carbonaceous materials. The slag formers may then melt by the combustion of a part of the carbonaceous material while the rest of this material forms the reducing layer. The ore and the reducing agent required for the reduction may then be supplied and the process carried out as described above.

By successively charging reducing agent, ore, oxygen gas and slag formers in adapted proportions the process now can proceed continuously with interruption only for discharging of slag and finished metal when the maximum filling level of the furnace is reached.

The invention will now be further explained by reference to the following examples.

*Example 1*

A horizontally lying, acidicly lined rotary furnace, as shown in the drawing, having a capacity of three tons, was charged with a magnetite concentrate with a particle size of 0.5–0.075 millimeter and with an iron content of 71.5% and a gangue content of 1.5%. The concentrate was blown into the furnace via the hopper at a rate of 12 kgs./min. with an air stream at a rate of 0.5 m.³/min. supplied through the air inlet. In order to deflect the concentrate towards the surface of the bath an extra air stream was in this case aimed at the concentrate stream which thereby stroke the surface of the bath at an angle of 30°. Simultaneously coke powder was blown into the furnace through the opposite opening by means of another hopper and pipe arrangement (not shown) at a rate of 5.5 kgs./min. with 0.2 m.³ air/min. with an inclination of 30° in relation to the surface of the bath. The coke powder contained 80% C and 16% slag and constituted the particle fraction 3–0.15 millimeter. Furthermore oxygen gas was blown in over the surface of the bath and parallel thereto from both ends of the furnace at a rate of 2.2 m.³/min. and 0.8 m.³/min., respectively. The exhaust gases were sucked out through the hood.

At the beginning of the experiment the furnace was charged with 2,189 kgs. of pig iron containing 2.99% C, 1.94% P, 0.0% Si and 0.0% Mn.

The experiment was carried out in such a way that concentrate, coke and oxygen were supplied in cycles of 20–25 min. after which samples of pig iron and slag were taken. During the blowing periods samples were taken of the exhaust gases from the furnace. During the whole experiment the furnace was rotated at a speed of 35 revolutions per minute.

The following table shows the course of the reduction.

| Cycle No. | Additions | | | Temp. °C. | Pig iron analysis | | $\frac{CO_2}{CO+CO_2}$ in the exhaust gases |
|---|---|---|---|---|---|---|---|
| | Concentr., kg. | Coke, kg. | Oxygen, m.³ | | Percent C | Percent P | |
| 0 | | | | 1,305 | 2.99 | 1.94 | |
| 1 | 250 | 120 | 87 | 1,240 | 2.85 | 1.82 | 0.77 |
| 2 | 250 | 120 | 95 | 1,270 | 3.17 | 1.70 | 0.82 |
| 3 | 250 | 120 | 93 | 1,290 | 3.35 | 1.63 | 0.86 |
| 4 | 250 | 120 | 85 | 1,280 | 3.57 | 1.50 | 0.87 |
| 5 | 250 | 120 | 89 | 1,295 | 3.55 | 1.33 | 0.80 |
| 6 | 300 | 120 | 111 | 1,325 | 3.56 | 1.27 | 0.81 |
| 7[1] | | | 8 | 1,300 | 3.74 | 1.27 | 0.98 |
| 8 | 250 | 120 | 83 | 1,285 | 3.74 | 1.22 | 0.68 |
| 9 | 300 | 120 | 92 | 1,280 | 3.56 | 1.13 | 0.79 |
| 10 | 300 | 120 | 111 | 1,290 | 3.55 | 1.05 | |

[1] Merely rotation under cautious blowing of oxygen over the bath.

After the experiment 3713 kgs. of melted pig iron was weighed out.

Since silica lining was used at the experiment and no basic slag formers were added the phosphorus transfer to the slag was very small. This means that by studying the decrease of the P-content during the experiment a good interpretation of the completeness of the reduction is obtained. The pig iron quantity weighed out does not include the pig iron content in the form of granules in the slag.

*Example 2*

As in Example 1 the same sort of concentrate was reduced, this time with graphite powder 2.5–0.15 mm. and during the latter part of the experiment with anthracite 2.5–0.15 mm. under injection of oxygen into the rotary 3 tons furnace previously described. This time the concentrate was blown at a rate of 9–10 kgs./min. and the graphite and the anthracite at about 4–5 kgs./min.

| Cycle No. | Additions | | | | Temp., °C., | Pig iron analysis | |
|---|---|---|---|---|---|---|---|
| | Concentr., kg. | Graphite, kg. | Anthracite, kg. | Oxygen, m.³ | | Percent C | Percent P |
| 0 | | | | | 1,320 | 3.18 | 1.80 |
| 1 | 250 | 114 | | 106 | 1,295 | 3.18 | 1.70 |
| 2 | 250 | 128 | | 110 | 1,310 | 3.50 | 1.62 |
| 3 | 250 | | 120 | 108 | 1,315 | 3.71 | 1.54 |
| 4 | 250 | | 120 | 109 | 1,320 | 3.50 | 1.46 |
| 5 | 250 | | | 90 | 91 | 1,320 | 3.26 | 1.38 |

At the beginning of the experiment the furnace was charged with 2645 kgs. of pig iron. At the end of the experiment 3506 kgs. of pig iron was weighed out.

During the two experiments described the heat in the exhaust gases was not utilized for preheating the starting materials.

*Example 3*

In this case the furnace, as illustrated, was lined with tar dolomite. Oxygen was supplied from both ends through the lances at a rate of 2.6 and 1.2 m.³/min., respectively, and a mixture of 11 kgs. ore and 4 kgs. coke nuts per minute was continuously supplied through the injection pipe to the reduction layer consisting of coke nuts. The ore analysis was:

| Percent Fe | Percent Mn | Percent $SiO_2$ | Percent P | Percent CaO | Percent MgO | Percent S | Percent $Al_2O_3$ |
|---|---|---|---|---|---|---|---|
| 60.1 | 0.6 | 7.1 | 0.42 | 2.3 | 1.1 | 0.03 | 1.3 |

The ore was crushed to a size less than 3 mm. The coke has a grain size not exceeding 8 mm. and its ashes content was 15%. Furthermore lime was supplied in an amount of 1 kg./min. The bath temperature was kept between 1350 and 1400° C. The gas leaving the furnace through the hood had an average composition of 80% $CO_2$ and 5% CO, the slag a composition of—

| Percent CaO | Percent MgO | Percent $SiO_2$ | Percent $P_2O_5$ | Percent Fe | Percent S |
|---|---|---|---|---|---|
| 40 | 6 | 30 | 1.7 | 3.5 | 0.25 | and the metal reduced out an average analysis of—

| Percent C | Percent Si | Percent Mn | Percent P | Percent S |
|---|---|---|---|---|
| 4.2 | 0.01 | 0.01 | 0.010 | 0.12 |

In this case the slag has a phosphorus content which is lower than the value obtained from the material balance with the supplied concentrate depending upon remaining slag from previous experiments with a similar concentrate but poorer in phosphorus. However an estimation shows that the phosphorus distribution between slag and metal corresponds to 37:1, which thus should be compared to about 1:9 in methods hitherto used.

*Example 4*

The same furnace as that used in Example 3 was charged with 500 kgs. slag of the composition shown in Example 3, 100 kgs. coke nuts, and heated to 1350° C. Without first charging pig iron, magnetite concentrate containing 57.8% Fe and 0.38% P in an amount of 15 kgs./min., coke containing 84% C and 9.7% ashes and of a grain size 0–30 mm. in an amount of 4–4.5 kgs./min. and lime powder in an amount of 1.5 kgs./min. was then fed into the furnace. Oxygen was supplied in an amount of 4.5–5 Nm.³/min. as a gas containing 96% $O_2$ divided in two streams, one at each of the ends of the furnace. The temperature of the slag was kept between 1300 and 1410° C. The exhaust gas had an average value of $CO_2/CO+CO_2$ of 0.97. The pig iron obtained contained 3.68% C, 0.00% Si, 0.04% Mn, 0.013% P, and 0.147% S.

As mentioned earlier, the main part of the heat necessary for the process is developed by burning the CO gas produced in the reduction. This heat, however, is generally not sufficient but also some direct combustion of the carbonaceous matter must take place. As an alternative, supplementary fuel in the form of gaseous, liquid or solid carbonaceous matter can be burnt in the gas space. It is also possible to supply oil or similar liquid carbonaceous matter to the bath surface.

We claim:

1. A process for producing liquid pig iron from iron oxide material, including iron ore, and solid carbonaceous material in a rotary furnace rotating about a substantially horizontal axis, which comprises establishing and maintaining during the process a body of liquid slag and solid carbonaceous material having a strongly reducing potential relative to iron oxide and being substantially evenly distributed horizontally in the furnace thereby shielding pig iron which accumulates below said body from the gas space above said body; supplying a combustion gas richer in oxygen than is air to the gas space above said body while maintaining the strongly reducing potential of said body, thereby oxidizing carbon monoxide evolved in the process to carbon dioxide and providing at least the main part of heat required for the process; successively supplying to said body raw materials comprising comminuted iron oxide material, including iron ore, and comminuted solid carbonaceous material; rotating the furnace at a velocity of more than 10 revolutions per minute to distribute said raw materials evenly over said body; supplying said raw materials in quantities, relative to the supply of gaseous oxygen, sufficient to reduce and carburize in said body substantially all of said iron oxide material into pig iron containing at least 2% by weight of carbon; and collecting pig iron formed in the process in a space beneath said body.

2. A process as claimed in claim 1, comprising supplying said raw materials in such proportions as to reduce and carburize said iron oxide material into pig iron containing at least 3% by weight of carbon.

3. A process as claimed in claim 1, in which the temperature in said body is not more than 1450° C.

4. A process as claimed in claim 1, in which said combustion gas rich in oxygen contains more than 40% oxygen.

5. A process as claimed in claim 1, in which the overall ratio of $CO_2$ to $CO$ in the waste gases from the furnace is at least about 2 to 1.

6. A process as claimed in claim 1, comprising supplying to the top of said body of slag iron ore material partly prereduced into metallic iron.

7. A process as claimed in claim 6, in which at least 10% of the iron of said iron ore material is in the form of oxides.

8. A process as claimed in claim 6, comprising prereducing iron ore in the dry state with gaseous reduction agents.

9. A process as claimed in claim 1, for producing pig iron poor in phosphorus from iron oxide matter rich in phosphorus, comprising supplying basic slag forming material of the group consisting of carbonates and oxides of calcium and magnesium to the furnace to form a body of molten basic slag, and supplying carbonaceous matter in comminuted form comprising pieces sized to form a reduction layer thereof floating on said body of slag, and supplying to said reduction layer said iron oxide matter and carbonaceous matter sufficient for the reduction and carburization of said iron oxide matter to pig iron.

10. A process as claimed in claim 9, comprising adjusting the content of iron oxide in said slag to at least 2% calculated as Fe by regulating the proportions of oxygen supplied in gaseous form and in the form of iron oxide matter and the thickness of said reduction layer of carbonaceous matter.

11. A process as claimed in claim 9, in which the temperature in said reduction layer is not more than 1450° C.

12. A process as claimed in claim 9, comprising supplying said basic slag forming material in a quantity to establish a molecular ratio of $CaO+MgO:SiO_2$ in the slag of over 1.

13. A process as claimed in claim 1, comprising supplying acidic slag forming material to said furnace to form an acidic slag.

References Cited by the Examiner
UNITED STATES PATENTS

| | | | |
|---|---|---|---|
| 1,490,012 | 4/24 | Kapteyn | 75—40 |
| 1,592,863 | 7/26 | Leonarz | 75—40 |
| 2,185,911 | 1/40 | Eulenstein | 75—40 |
| 2,756,137 | 7/56 | Kocks | 75—40 |

OTHER REFERENCES

The Making, Shaping and Treating of Steel, 7th edition, published by United States Steel Corporation, Pittsburgh, Pa., 1957, pages 221–223 relied upon.

DAVID L. RECK, *Primary Examiner.*